March 3, 1931. J. E. BELL 1,795,070
DISTILLATION OF OIL
Filed Nov. 1, 1924 2 Sheets-Sheet 2
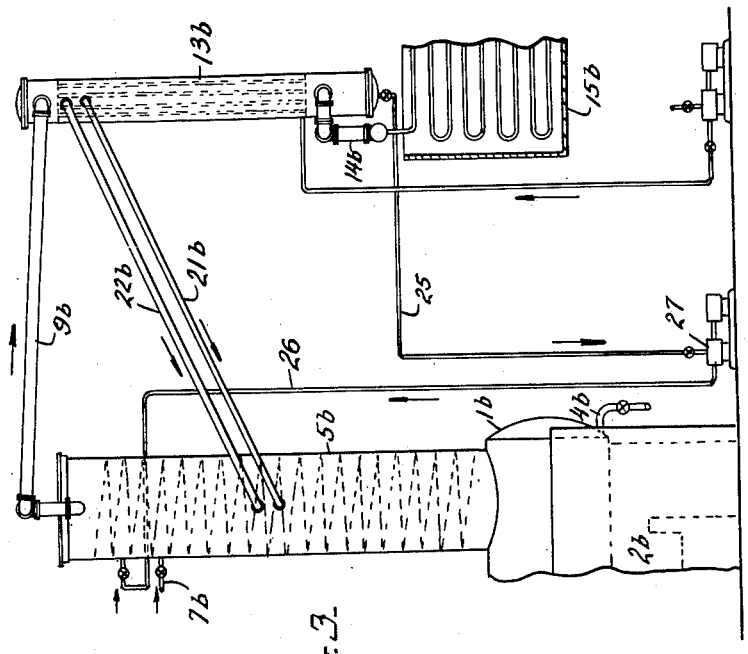
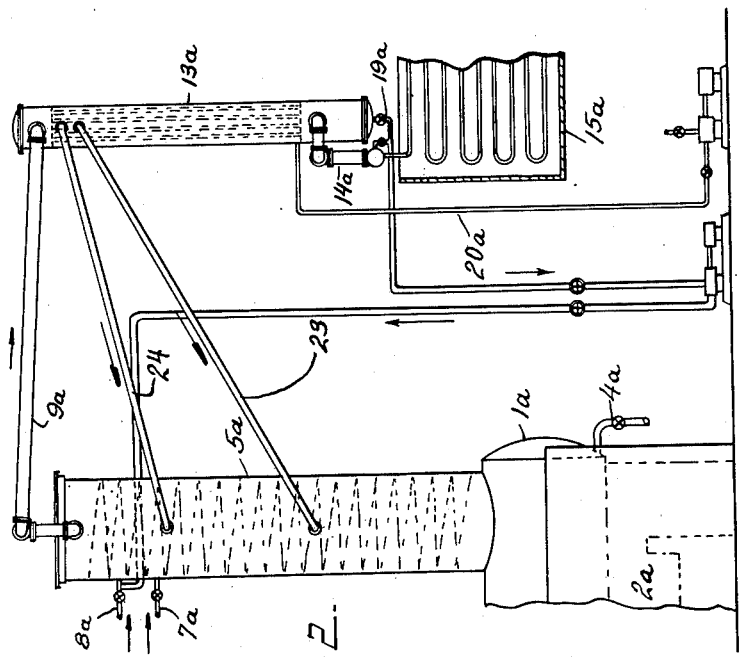
INVENTOR
John E. Bell
BY
ATTORNEYS Patented Mar. 3, 1931

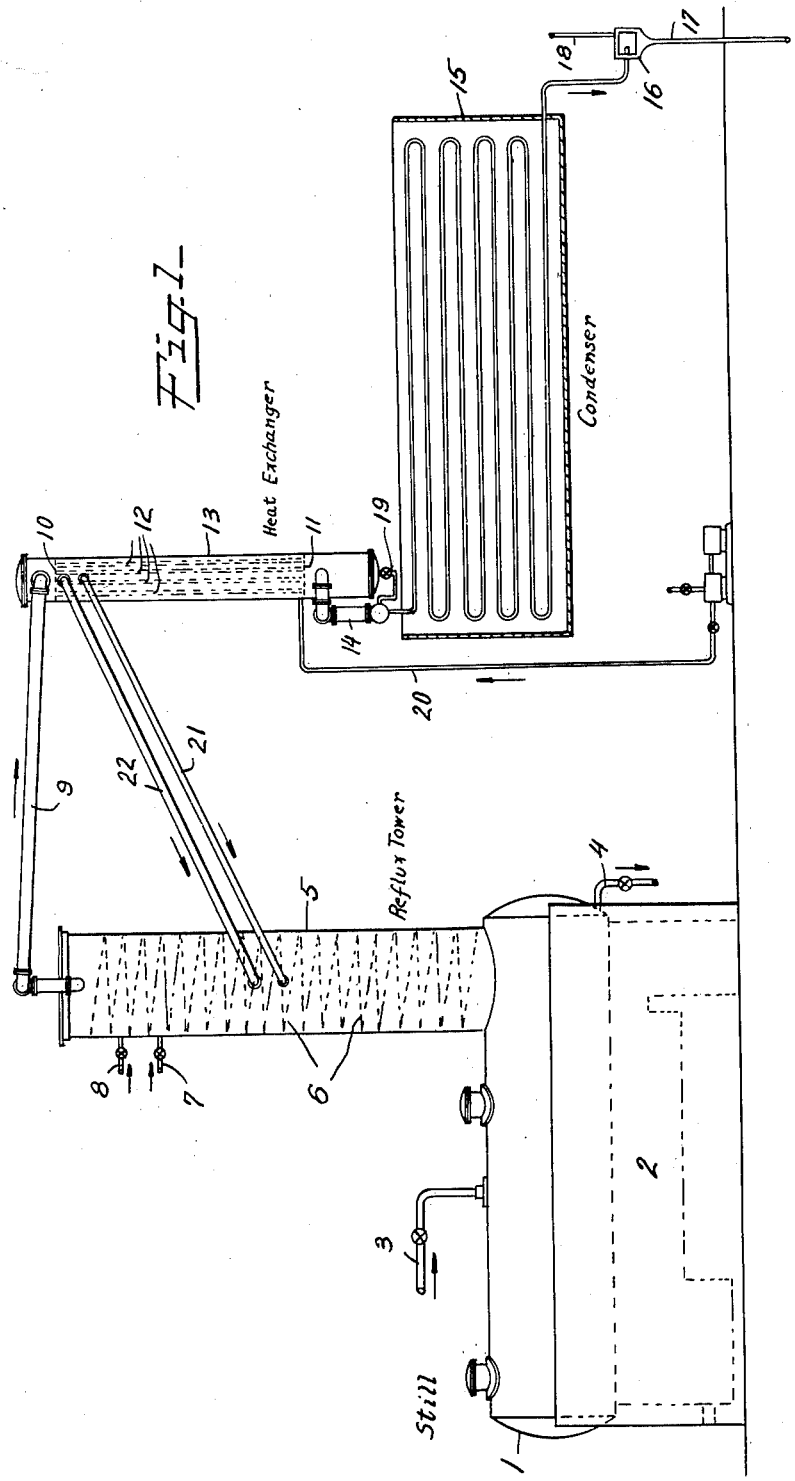

1,795,070

UNITED STATES PATENT OFFICE

JOHN E. BELL, OF BROOKLYN, NEW YORK, ASSIGNOR TO SINCLAIR REFINING COMPANY, OF CHICAGO, ILLINOIS, A CORPORATION OF MAINE

DISTILLATION OF OIL

Application filed November 1, 1924. Serial No. 747,194.

This invention relates to improvements in the fractional distillation of hydrocarbon oils, such as petroleum, and the various oils and distillates derived from petroleum.

In the fractional distillation of petroleum, as heretofore proposed, the vapors from the still in which the oil is subjected to distillation have been passed through reflux or fractionating towers from which the heavier constituents were returned to the still, and the vapors escaping from the tower have been condensed by heat interchange with cooling water, substantially all of the heat of the vapors escaping from the tower above the sensible heat of the condensed distillate being absorbed by the cooling water. Various proposals to employ in the distilling operation a part of the heat given off by the vapors as they are cooled and condensed have also been made, but, in the methods and apparatus of such proposals as were adapted for commercial use, any improvement in heat economy has usually been accompanied by a decrease either in the efficiency of the distillation or in the accuracy of the fractionation. One of the objects of the present invention is to provide an improved method and apparatus whereby close fractionation can be effected with improved heat economy, and with the recovery and use in the distillation of a substantial part of the heat in the vapors escaping from the reflux tower which is usually absorbed in the cooling water.

In the method of the present invention, the vapors from the still are first passed through a reflux tower in which they are subjected to direct contact with cooler oil and are then brought into indirect heat exchanging relation with fresh oil which is subsequently introduced into the still, and the operation is carried out so that close fractionation is made possible while a substantial part of the heat in the vapors escaping from the reflux tower is returned and employed in the distillation.

Apparatus adapted for the practice of the invention comprises a still, a reflux tower, a heat exchanger having a vapor separator and a condenser, and connections for conducting vapors from the still to the condenser successively through the reflux tower and the heat exchanger. Connections are provided for passing either all or a part of the fresh oil through the heat exchanger and then introducing it into the still, through the reflux tower, and separate connections are provided for introducing into the reflux tower any vapors liberated and separated from the fresh oil in the heat exchanger. The fresh oil may also be introduced directly into the still from the heat exchanger. Connections are also arranged for introducing a light oil into the upper end of the tower, and these connections may with advantage be arranged for introducing condensate formed from the vapors entering the heat exchanger into the upper end of the tower. Connections may also be arranged for introducing cool oil from a separate source, or a part of the fresh oil which is not passed through the heat exchanger, into the upper end of the reflux tower.

The reflux tower and the heat exchanger, and the connections for handling the hot vapors and preheated fresh oil, may, with particular advantage, be lagged or insulated to prevent heat loss; and in carrying out the process of the present invention close fractionation can nevertheless be effected. The dissipation of heat to the atmosphere may thus be reduced and the efficiency of the operation increased without reducing the accuracy of the fractional distillation. Certain advantages of the invention are obtained, however, where such insulation is omitted in whole or in part.

The vapors escaping from the reflux tower are cooled, and may be partly condensed, in the heat exchanger, and the cooled vapors may then be subjected to further condensation in the ordinary way. The fresh oil is preheated in the heat exchanger and may also be partly vaporized therein. The preheated fresh oil is then introduced into the distilling operation so that the heat absorbed from the vapors in the heat exchanger is returned and employed in the distilling operation, reducing the amount of heat required to effect the distillation. This heat is returned as sensible heat in the preheated liquid fresh oil, and is returned in part as sensible heat and in part as heat of vaporization of such constituents of the fresh oil as may be vaporized, and which would otherwise be vaporized and absorb heat in the still.

The vapors in the reflux tower are cooled and the heavier constituents are refluxed by direct contact and heat exchange with the cooler oil introduced into the reflux tower. Cooler oil which has not passed through the heat exchanger may be introduced to promote the refluxing operation; or the preheated fresh oil, which is however cooler than the vapors entering the reflux tower from the still, may be introduced into direct contact with the vapors in the reflux tower; or both the preheated fresh oil and cooler oil from a source other than the heat exchanger may be employed. By introducing into the reflux tower any vapors liberated from the fresh oil in the heat exchanger, they are also subjected to the refluxing operation therein.

Where fresh oil to be distilled is introduced both directly into the reflux tower and into the reflux tower from the heat exchanger, the operation may be regulated by varying the relative amount of fresh oil introduced directly into the reflux tower so that the heavier vapors in the reflux tower can be refluxed without refluxing the lighter constituents constituting the desired fraction while a part of the heat in the vapors escaping from the still is nevertheless absorbed in that part of the fresh oil passing through the heat exchanger and returned to the still.

Where the preheated fresh oil, together with any vaporized constituents, is introduced into the reflux tower, it is advantageously introduced at an intermediate point so that the liquid fresh oil flows downwardly through the lower part of the tower in contact with the fresh vapors from the still refluxing the heavier constituents from them and giving up as a vapor its lighter constituents, and so that the vaporized constituents of the fresh oil flow upwardly through the upper part of the tower and are subjected to the refluxing operation therein to reflux any heavier constituents. The vaporized and liquid constituents of the preheated fresh oil may be introduced at immediately adjacent points or the vaporized constituents may be introduced at a higher point and the preheated liquid oil introduced at a lower point.

One particularly advantageous way of carrying out the invention is to introduce the liquid oil from the heat exchanger into the reflux tower at a point where the composition of the reflux in the tower corresponds to that of the liquid constituents, and similarly to introduce the constituents of the oil vaporized in the heat exchanger at a point where the composition of the vapor constituents in the reflux tower is of corresponding character. The fresh oil in effect is subjected to a preliminary distillation in the heat exchanger so that the unvaporized oil is somewhat heavier than the fresh oil introduced into the exchanger and the vaporized constituents are somewhat lighter. At any given point in the reflux tower, the liquid reflux is somewhat lighter and the vapor constituents are somewhat heavier in composition than corresponds to static equilibrium.

Accordingly, the liquid oil from the heat exchanger may be introduced at a lower point and the vaporized constituents of the fresh oil at a higher point with particular advantage. The separated liquid and vapor constituents of the fresh oil may then be subjected to the refluxing operation under conditions most appropriate for separation of the desired fraction or fractions.

A lighter oil or distillate may also be introduced into the top of the tower to assist in controlling the refluxing operation and to improve the fractionation as well as to increase the capacity of the still and reflux tower. The lighter oil introduced into the top of the tower is vaporized and exerts a cooling effect which serves to reflux the heavier constituents due to the heat absorbed in vaporization, and the temperature at the top of the tower, as well as the character of the fraction escaping from the tower, can be closely controlled by regulating the amount and character of the lighter oil so introduced. A part of the condensed distillate, or an oil of somewhat lower average boiling point, may be employed for this purpose; or the condensate, if any, formed from the vapors entering the heat exchanger may be returned and introduced into the top of the tower to regulate and control the refluxing operation. Where this intermediate condensate is employed for regulating the refluxing operation, no heat is lost by returning it to the reflux tower where it is revaporized since the heat of condensation is absorbed in the fresh oil in the heat exchanger. The introduction of a lighter oil into the top of the reflux tower in this way is particularly advantageous where the preheated fresh oil from the heat exchanger is introduced into the reflux tower since it enables the maintenance of a relatively low temperature at the top of the tower and makes close fractionation possible without, however, requiring dissipation of heat from the reflux tower.

In carrying out the distillation, the temperature of the oil in the still is in general somewhat higher than the temperature of the oil flowing from the bottom of the reflux tower into the still. Where the fresh oil is introduced into the reflux tower, however, the distillation may be regulated so that the temperature of the reflux entering the still approximates that of the oil in the still and so that practically all of the overhead distillate escaping from the tower is distilled in the tower itself from the fresh oil which is introduced into the tower.

The form and arrangement of the heat exchanger employed in carrying out the invention may vary but it is particularly advantageous to employ a heat exchanger having vertically arranged passages and to flow the vapors from the reflux tower downwardly therethrough and the fresh oil upwardly in countercurrent to the vapors. By arranging and operating the heat exchanger in this manner, the separation of vaporized constituents from the fresh oil and of condensed constituents from the vapors entering the heat exchanger from the reflux tower is promoted.

The invention is of special application for rerunning benzine, or pressure distillate, or mixtures or blends of pressure distillate and straight run benzine, for the recovery of gasoline; but it is also of value for rerunning gas oil for separating gasoline or other light fractions therefrom, as well as for the distillation of crude petroleum or other petroleum fractions or distillates where it is desirable to obtain close fractionation.

The invention will be further described in connection with the accompanying drawings illustrating in a somewhat conventional and diagrammatic manner, certain embodiments of apparatus adapted for the practice of the process of the invention; but it is intended and will be understood that the invention is illustrated thereby but is not limited thereto.

In the accompanying drawings:

Fig. 1 represents in elevation, and partly in section, a still, a reflux tower, a heat exchanger and a condenser arranged to carry out the invention.

Fig. 2 is a fragmentary view showing a modified arrangement of the apparatus, and Fig. 3 is a similar view showing another modification of the apparatus.

The still illustrated in the drawings is of the direct fire heated type and comprises a shell 1 arranged over a setting 2. The still is provided with a charging line 3 for the introduction of fresh oil, and a drawoff line 4 arranged for discharging desidual oil from the still. Arranged above the still, and directly communicating with the vapor space therein, is a reflux tower 5 provided with a helical baffle 6. A connection 7 is provided near the top of the tower for introducing fresh oil, and a connection 8 is provided at a somewhat higher point for introducing a lighter oil for controlling the operation of the reflux tower. The vapors escape from the top of the reflux tower to the heat exchanger through vapor line 9.

The reflux tower illustrated in the drawings is of the general type described and illustrated in an application filed April 1, 1924, Serial No. 703,338, Patent No. 1,683,151, and reference may be made to this application for a more complete description of the construction of this type of tower. The present invention is of special value and application in connection with towers of this type, and in connection with certain methods of distillation described in the said application. Reflux towers of other suitable construction may be employed, however, in carrying out the present invention.

The heat exchanger illustrated is of the vertical, tubular type, and comprises a cylindrical shell 13 having header sheets 10 and 11, arranged near the upper and lower ends of the heat exchanger, connected by tubes 12. The vapors from the reflux tower enter the compartment above the sheet 10 and flow through the tubes 12 to the compartment below the sheet 11. The partially cooled vapors escape from the lower compartment through the vapor line 14 and are discharged into the condenser 15. The condenser discharges into the separator 16 from which the condensed distillate flows to a rundown tank or other receiver through connection 17. Any uncondensed vapors and gases escape through connection 18. A connection 19 is provided to discharge through the condenser any condensate formed from the vapors entering the heat exchanger.

Fresh oil is forced into the intermediate compartment between the header sheets 10 and 11 through connection 20, and passes upwardly around the tubes 12. Opening into the shell of the heat exchanger somewhat below the upper end of the intermediate compartment is the overflow liquid line 21, and the fresh oil overflows from the space about the tubes in the heat exchanger through this connection and is discharged into the reflux tower on the still. A second connection, of somewhat larger size, is provided to conduct vapor from the upper end of the intermediate compartment in the heat exchanger, above the outlet to the connection 21, to the reflux tower and to discharge them into the reflux tower at a point just above the inlet of the liquid connection 21.

In carrying out the process of the invention in the apparatus illustrated, an initial charge of oil is introduced into the still 1 through the charging line 3 and the still charge is brought to the appropriate temperature for effecting the distillation. As vapors form in the still they pass upwardly through the reflux tower. After the still is brought to the distillation temperature, additional fresh oil is forced through the space about the tubes in the heat exchanger and enters the reflux tower at an intermediate point as it overflows from the heat exchanger through connection 21. Any part of the fresh oil which is vaporized in the heat exchanger is also introduced at a somewhat higher intermediate point in the reflux tower through the connection 22. The vapors escaping from the upper end of the reflux tower pass downwardly through the tubes in the heat exchanger and give up a part of their heat to the fresh oil, the vapors being cooled and the fresh oil being preheated. A lighter oil, corresponding to the desired distillate or of a somewhat lower average boiling point, is introduced into the upper end of the reflux tower, above the inlets of connections 21 and 22, through connection 8. Additional fresh oil may also be introduced into the upper end of the reflux tower through connection 7. Residual oil is withdrawn from the still through connection 4 to maintain the still charge at the desired point.

The preheated fresh oil flows downwardly through the lower part of the reflux tower refluxing heavier constituents from the vapors from the still and giving up its lighter constituents as vapors. The constituents vaporized in the heat exchanger flow upwardly through the upper part of the tower and any heavier constituents of the vaporized oil are refluxed therein. The lighter oil introduced through connection 8 is vaporized and produces a cooling effect in the upper end of the tower which further assists the refluxing operation. The head temperature of the reflux tower and the character of the fraction escaping from the tower, is controlled by regulating the amount of light oil introduced through connection 8. Supplementary control of the refluxing operation may be had by introducing a regulated amount of cool oil through connection 7. This oil may be of the same character as that from the heat exchanger, or it may be of a character intermediate the fresh oil and the lighter oil introduced at the upper end of the tower.

In the modified arrangement illustrated in Fig. 2, the same parts are designated by the same reference numerals with the letter "a" appended. The general operation is the same as has been described in connection with Fig. 1, and the arrangement of the apparatus is the same with the exception of the liquid and vapor connections for discharging the preheated oil from the heat exchanger into the reflux tower and the alternative connections for returning condensate produced in the heat exchanger to the reflux tower, which feature is more fully discussed in the description of the modification shown in Fig. 3.

In the apparatus illustrated in Fig. 2, the connection 23 is arranged to discharge the preheated liquid oil into the lower part of the reflux tower, and the connection 24 is arranged to discharge the constituents vaporized from the fresh oil in the heat exchanger into the upper part of the reflux tower. In operation, the vaporized constituents from the heat exchanger are introduced into the tower at a point where they are substantially in equilibrium with the vapor components in the tower and the liquid constituents are introduced at a lower point where they are substantially in equilibrium with the reflux. The vaporized constituents then flow upwardly through the tower where they are subjected to the refluxing operation and any entrained or vaporized constituents therein heavier than the desired distillate are refluxed. The liquid constituents flow downwardly in direct contact with the hot vapors from the still and are subjected to distillation in the tower and in the still. Additional fresh oil, or other cool oil, may also be introduced through connection 7a; and the refluxing operation may be controlled by introducing a regulated amount of a lighter oil into the upper end of the tower through connection 8a. The inlet of connection 24 is arranged below the inlets of connections 7a and 8a so that the vaporized constituents discharged into the reflux tower through connection 24 may be subjected to refluxing in contact with oil introduced through the latter connections.

In the modified arrangement illustrated in Fig. 3, the same parts are designated by the same reference numerals with the letter "b" appended. The general operation and arrangement of the apparatus is the same as has been described in connection with Fig. 1.

In the apparatus illustrated in Fig. 3, the condensate produced in the heat exchanger from the vapors entering it from the reflux tower is employed for controlling the refluxing operation, and for this purpose connections 25 and 26, and pump 27 are provided for returning the condensate collecting in the lower compartment of the heat exchanger and introducing it into the upper end of the reflux tower. By returning condensate from the heat exchanger for controlling the refluxing operation, the heat of vaporization of the condensate formed in the heat exchanger is absorbed by the fresh oil passing through the heat exchanger on its way to the still and is returned to the still with the fresh oil, and control is effected without loss of the heat required to vaporize the light oil introduced into the top of the tower. At the same time, a further opportunity is provided for the separation of heavier constituents in the heat exchanger and these constituents are returned to the reflux tower with the condensate. Control of the refluxing operation by the introduction of the condensate from the heat exchanger may be supplemented by the introduction of a regulated amount of a light oil through connection 7b. Additional fresh oil may also be introduced through connection 7b; and where a supplemental amount of a light oil is employed for controlling the refluxing operation it may be introduced in admixture with the heavier oil.

A combined distilling and refining operation may be carried out in accordance with the method of operation described in an application filed October 22, 1924, Serial Number 745,135, Patent No. 1,639,531, by introducing an alkali into the reflux tower on the still. The alkali may be introduced in the form of an aqueous solution or suspension, either alone or in admixture with oil, into the upper end of the reflux tower; and serves to improve the quality of the distillate, particularly in the redistillation of oils which have been subjected to refining treatment with sulfuric acid, and to protect the reflux tower against corrosion. One particularly advantageous way of introducing the alkali is to mix in a centrifugal pump a solution of the alkali with fresh oil which is introduced into the reflux tower, so that the alkali is intimately dispersed through the oil in the form of an emulsion. The alkali may be introduced into the top of the reflux tower in admixture with oil which is not passed through the heat exchanger, or it may be introduced with the fresh oil which is passed through the heat exchanger.

One of the important advantages of the present invention is the improved heat economy effected, and it is characteristic of the present invention that this economy is effected without sacrifice of close fractionation. A substantial part of the heat in the vapors escaping from the reflux tower is returned to the distilling operation so that less fuel need be burned to carry out the distillation, or, conversely, the capacity of the distillation equipment may be increased. At the same time, due to the partial cooling of the vapors, the temperature of the vapors entering the condenser may be reduced.

I claim:

1. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby preheating and partially vaporizing the fresh oil and cooling the vapors from the reflux tower, separately introducing the preheated liquid fresh oil and the vapors from the fresh oil into the reflux tower, and subjecting the vapors from the still together with the vapors from the fresh oil from the heat exchanger to a refluxing operation controlled by the introduction of lighter oil to the top of said reflux tower.

2. An improved method of distilling hydrocarbon oil, which comprises heating the oil in a still and driving off vapors therefrom to a reflux tower, bringing the uncondensed vapors from the reflux tower into heat exchanging relation with fresh oil and cooling the vapors from the reflux tower, introducing the preheated fresh oil and the vapors from the fresh oil into the reflux tower at an intermediate point and passing the preheated liquid oil downwardly and the vaporized fresh oil together with the hot vapors from the still upwardly through the tower in direct contact with a lighter oil introduced at a higher point in said reflux tower.

3. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby preheating it and cooling the vapors, introducing the preheated liquid fresh oil into the tower, introducing the vapors from the fresh oil at a higher point, and introducing additional oil into said reflux tower at a still higher point.

4. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby preheating and partially vaporizing the fresh oil and cooling the vapors from the reflux tower, introducing the preheated liquid fresh oil and the vapors from the fresh oil into the reflux tower in direct contact with the vapors and liquids therein, and returning condensate formed in the heat exchanger to the reflux tower at a point above that at which fresh oil and vapors from the heat exchanger are introduced thereto.

5. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby vaporizing lighter constituents of the fresh oil, introducing the preheated liquid fresh oil into the reflux tower at a point where the composition of the reflux in the tower corresponds approximately to that of the preheated liquid fresh oil, and introducing the vaporized constituents into the reflux tower at a higher point.

6. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby vaporizing lighter constituents of the fresh oil, introducing the preheated liquid fresh oil into the reflux tower at a point where the composition of the reflux in the tower approximately corresponds to that of the preheated liquid fresh oil, and introducing the vaporized constituents into the reflux tower at a point where the composition of the vapor constituents in the reflux tower corresponds approximately to that of the vaporized constituents of the fresh oil.

7. An improved method of distilling hydrocarbon oils, which comprises heating the oil in a still and driving off vapors therefrom into a reflux tower, bringing the uncondensed vapors from the reflux tower into indirect heat exchanging relation with fresh oil and thereby vaporizing lighter constituents of the fresh oil and condensing heavier constituents of the vapors, introducing the liquid fresh oil into the reflux tower at a point where the composition of the reflux in the tower corresponds approximately to that of the liquid fresh oil, introducing the vaporized constituents into the reflux tower at a higher point, and returning condensate formed in the heat exchanger to the reflux tower at a still higher point.

In testimony whereof I affix my signature.

JOHN E. BELL.